United States Patent
Hasegawa et al.

(10) Patent No.: US 11,208,508 B2
(45) Date of Patent: Dec. 28, 2021

(54) POLYMER FINE PARTICLES MANUFACTURING METHOD

(71) Applicant: TOAGOSEI CO., LTD., Tokyo (JP)

(72) Inventors: Takashi Hasegawa, Nagoya (JP); Naohiko Saito, Nagoya (JP); Atsushi Nishiwaki, Nagoya (JP); Hideo Matsuzaki, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 251 days.

(21) Appl. No.: 16/474,012

(22) PCT Filed: Dec. 22, 2017

(86) PCT No.: PCT/JP2017/046070
§ 371 (c)(1),
(2) Date: Jun. 26, 2019

(87) PCT Pub. No.: WO2018/123844
PCT Pub. Date: Jul. 5, 2018

(65) Prior Publication Data
US 2019/0338057 A1 Nov. 7, 2019

(30) Foreign Application Priority Data
Dec. 26, 2016 (JP) .............................. JP2016-250870

(51) Int. Cl.
*C08F 2/01* (2006.01)
*C08F 20/06* (2006.01)
(Continued)

(52) U.S. Cl.
CPC .......... *C08F 20/06* (2013.01); *B01F 7/00008* (2013.01); *B01F 7/00925* (2013.01); *B01F 7/20* (2013.01); *C08F 2/01* (2013.01)

(58) Field of Classification Search
None
See application file for complete search history.

(56) References Cited

U.S. PATENT DOCUMENTS

| 4,988,568 A | 1/1991 | Hasegawa et al. |
| 5,043,407 A | 8/1991 | Hasegawa et al. |

(Continued)

FOREIGN PATENT DOCUMENTS

| CN | 101501077 A | 8/2009 |
| CN | 102439050 A | 5/2012 |

(Continued)

OTHER PUBLICATIONS

Feb. 5, 2021 Office Action issued in Chinese Patent Application No. 201780078418.6.

(Continued)

*Primary Examiner* — Richard A Huhn
(74) *Attorney, Agent, or Firm* — Oliff PLC (57) ABSTRACT

A method for manufacturing polymer fine particles having a narrow particle diameter distribution without any particular limitations on the raw materials and the like. To achieve this purpose, this method for manufacturing polymer fine particles includes polymerizing a vinyl monomer using a dispersion polymerization method, wherein the amount of water in the reaction liquid in the polymerizing is no more than 30,000 ppm, the reactor for carrying out the polymerizing is a stirring tank reactor, the stirring blade attached to the stirring rotation shaft of the stirring tank reactor is one type selected from a large wide blade and a large lattice blade, and the tip speed of the stirring blade is no more than 1.0 m/sec.

11 Claims, 2 Drawing Sheets

(51) Int. Cl.
   *B01F 7/20*       (2006.01)
   *B01F 7/00*       (2006.01)

(56) References Cited

U.S. PATENT DOCUMENTS

| | | |
|---|---|---|
| 2007/0243485 A1 | 10/2007 | Kurokawa |
| 2010/0069592 A1 | 3/2010 | Matzuaki et al. |
| 2012/0178840 A1 | 7/2012 | Sasaki et al. |
| 2012/0189848 A1 | 7/2012 | Yamauchi et al. |
| 2012/0196127 A1 | 8/2012 | Murakami |
| 2014/0329024 A1 | 11/2014 | Leem et al. |

FOREIGN PATENT DOCUMENTS

| | | |
|---|---|---|
| CN | 102482360 A | 5/2012 |
| CN | 102898565 A | 1/2013 |
| CN | 104220464 A | 12/2014 |
| JP | S63-297402 A | 12/1988 |
| JP | H01-315408 A | 12/1989 |
| JP | H04-279604 A | 10/1992 |
| JP | H04-279605 A | 10/1992 |
| JP | H06-032807 A | 2/1994 |
| JP | H09-316106 A | 12/1997 |
| JP | H10-195190 A | 7/1998 |
| JP | 2005-272779 A | 10/2005 |
| JP | 2006-282772 A | 10/2006 |
| JP | 2009-084401 A | 4/2009 |
| WO | 2005/122700 A3 | 3/2006 |
| WO | 2011/043343 A1 | 4/2011 |

OTHER PUBLICATIONS

Feb. 16, 2021 Office Action issued in Japanese Patent Application No. 2018-559141.

Apr. 3, 2018 Written Opinion issued in International Patent Appleca-tion No. PCT/JP2017/046070.

Apr. 3, 2018 International Search Report issued in International Application No. PCT/JP2017/046070.

Jul. 19, 2021 Office Action issued in Chinese Patent Application No. 201780078418.6.

POLYMER FINE PARTICLES MANUFACTURING METHOD

TECHNICAL FIELD

The present teaching relates to a method for manufacturing a polymer fine particles. More specifically, the present teaching relates to method for efficiently manufacturing a polymer fine particles with narrow particle size distribution.

BACKGROUND ART

Polymer fine particles are used effectively as spacers for liquid crystal displays, as light diffusing agents in light diffusing films and diffusing plates and the like, and as AG agents in AG films and the like. They are also widely used in various other fields as anti-blocking agents in various films, as conductive fine particles, column fillers and diagnostic drug carriers, and in photographic toners and cosmetics and the like. Many applications may require that the polymer fine particles have narrow particle size distribution in order to improve performance.

Suspension polymerization methods, seed polymerization methods, dispersion polymerization methods and the like are well known as methods for manufacturing polymer fine particles. Of these, dispersion polymerization allows the particles size to be set somewhat arbitrarily, and can also yield a polymer fine particles with sharp particle size distribution. From an industrial perspective, this polymerization method is also advantageous for obtaining a monodispersed polymer fine particles because it does not require complex processes.

Conventionally, methods for manufacturing monodispersed polymer fine particles by dispersion polymerization have been proposed.

Patent Literature 1 discloses a method for manufacturing a monodispersed polymer fine particles by performing dispersion polymerization of a vinyl monomer in an alcohol solvent in the presence of a polymer obtained by polymerizing a monomer with a specific structure. Patent Literature 2 and 3 describe methods for manufacturing monodispersed polyacrylamide fine particles by polymerizing polyacrylamide or the like in a mixture of water and a water-miscible solvent in the presence of polyvinylpyrrolidone or a polyvinylpyrrolidone copolymer with a weight-average molecular weight of at least 10,000, or polyacrylic acid or a polyacrylic acid copolymer.

Patent Literature 4 discloses a method for manufacturing a crosslinked spherical polymer fine particles by dispersion polymerization of raw material monomers including a monomer having two or more unsaturated double bonds. Patent Literature 5 describes a method for manufacturing a hydrophilic gel fine particles by dispersion polymerization of monomers including a crosslinkable ethylenically unsaturated monomer and an ethylenically unsaturated carboxylic acid and the like.

CITATION LIST

Patent Literature 1: Japanese Patent Application Publication No. H09-316106
Patent Literature 2: Japanese Patent Application Publication No. H04-279604
Patent Literature 3: Japanese Patent Application Publication No. H04-279605
Patent Literature 4: Japanese Patent Application Publication No. 2006-282772
Patent Literature 5: Japanese Patent Application Publication No. H01-315408 [0004]

SUMMARY

Technical Problem

The teachings described in Patent Literature 1 to 3 use relatively large amounts of dispersion stabilizers or similar compounds in the polymerization process. As a consequence, dispersion stabilizer components remain in the resulting polymer fine particles, and may create problems such as decreased performance or reduced purity of products using the polymer fine particles. Another issue is that the number of manufacturing steps is increased and more time is required because the dispersion stabilizer must be synthesized separately.

The teaching described in Patent Literature 4 effectively requires a large amount of a multifunctional monomer. The detailed description of the teaching states that the content of the multifunctional monomer is less than 35 mass % of all of the raw material monomers, and also that it may be difficult in some cases to obtain a monodispersed spherical polymer fine particles due to adhesion and aggregation of particles with each other. In the teaching described in Patent Literature 5, the ethylenically unsaturated carboxylic acid is an essential component for maintaining the monodisperity of the particle size distribution, but it is also stated that the particle size distribution becomes broader if the ethylenically unsaturated carboxylic acid exceeds 30 wt % of the total monomers. Thus, the teachings of Patent Literature 4 and 5 restrict the types and amounts of the monomers used in in order to obtain monodispersed polymer fine particles.

The present teaching was developed in light of these circumstances. That is, it is an object of the teaching to provide a method for manufacturing a polymer fine particles with narrow particle size distribution, without requiring any particular dispersion stabilizer or the like, and without restricting the types and amounts of the raw material monomers including multifunctional monomers.

Solution to Technical Problem

The inventors discovered as a result of exhaustive research aimed at solving these problems that a monodispersed polymer fine particles could be produced without any particular restrictions on the raw material monomers used by adjusting the tip speed (peripheral speed) of the stirring blade in dispersion polymerization using a so-called large-blade as a stirring blade. We also discovered that the amount of water in the polymerization solution affects the monodisperity of the resulting polymer fine particles, and perfected the present teaching based on these findings.

The present Description provides the following means.

[1] A method for manufacturing polymer fine particles, comprising:
polymerizing a vinyl monomer using a dispersion polymerization method,
wherein the amount of water in the reaction liquid in the polymerizing is no more than 30,000 ppm, the e reactor in the polymerizing is a stirred tank type reactor, and the stirring blade mounted on the rotating stirring shaft of the stirred tank type reactor is one selected from a large wide blade and a large lattice blade and the tip speed of the stirring blade is not more than 1.0 m/sec.

[2] The method for manufacturing polymer fine particles according to [1] above, wherein the large wide blade is a Fullzone-type stirring blade.

[3] The method for manufacturing polymer fine particles according to [2] above, wherein the large lattice blade is a Maxblend-type stirring blade.

[4] The method for manufacturing polymer fine particles according to any one of [1] to [3] above, wherein the vinyl monomer contains (meth)acrylic acid in the amount of at least 50 mass % of the total amount of the vinyl monomer.

[5] The method for manufacturing polymer fine particles according to any one of [1] to [4] above, wherein the SP value of the polymerization solvent used in the polymerizing is 8.0 to 13.0.

Advantageous Effects

With the method for manufacturing a polymer fine particles of the teaching, a polymer fine particles having narrow particle size distribution and excellent uniformity of particles size can be manufactured by an easy process. This method is also advantageous from the standpoint of productivity because there is no need to separately prepare a special dispersion stabilizer or the like during manufacture.

The manufacturing method of the teaching can be applied to a wide range of monomer compositions because it places no special restrictions on the types or amounts of raw material monomers used, including multifunctional monomers. Specifically, a polymer fine particles with good monodisperity can still be obtained even if the content of a multifunctional monomer is less than 35 mass % of the raw material monomers as a whole, or if the content of an ethylenically unsaturated carboxylic acid exceeds 30 wt % of the total monomers.

BRIEF DESCRIPTION OF DRAWINGS

FIG. 1 shows one example of a reactor equipped with a Fullzone-type stirring blade. (A) is a schematic cross-sectional side view, and (B) is a schematic cross-sectional plane view; and FIG. 2 shows one example of a reactor equipped with a Maxblend-type stirring blade. (A) is a schematic cross-sectional side view, and (B) is a schematic cross-sectional plane view.

DESCRIPTION OF EMBODIMENTS

The present teaching is explained in detail below. In the present Description, "(meth)acrylic" means acrylic and/or methacrylic, and "(meth)acrylate" means acrylate and/or methacrylate. Moreover, a "(meth)acryloyl group" is an acryloyl group and/or a methacryloyl group.

The present teaching relates to a method for manufacturing a polymer fine particles, comprising a polymerization step using a dispersion polymerization method. In this polymerization step, a polymerization reaction in which a vinyl monomer is polymerized in a solvent that dissolves the vinyl monomer but does not dissolve the resulting polymer is performed using a reactor equipped with a so-called large blade as a stirring blade. In the present teaching, a hydrolysis step, separation step, washing step (purification step) or drying or another polymerization steps or the like may also be performed as necessary after the polymerization step.

In dispersion polymerization, the precipitated polymer becomes larger by aggregation and growth as polymerization progresses, resulting in a polymer fine particles with an extremely small micro-sized particles diameter. The polymer fine particles obtained by the manufacturing method of the teaching has a uniform particles size with narrow particle size distribution, and is monodispersed with very little aggregation between particles.

In the case of dispersion polymerization, a solvent selected from various organic solvents and the like may be used as the polymerization solvent after considering the types of monomers used and the like.

Specific examples of polymerization solvents include water-soluble solvents such as methanol, ethanol, isopropyl alcohol, t-butyl alcohol, acetone, acetonitrile and tetrahydrofuran, as well as benzene, toluene, ethyl acetate, methyl ethyl ketone, dichloroethane, n-hexane, cyclohexane, n-heptane and the like. One of these alone or a combination of two or more may be used. In the present teaching, a water-soluble solvent is one having a solubility greater than 10 g/100 ml in water at 20° C.

Of these polymerization solvents, one with a solubility parameter (SP value) in the range of 8.0 to 13.0 is preferred considering the solubility of the monomers and the resulting polymer. Specific examples include cyclohexane (SP value: 8.2), toluene (SP value: 8.9), ethyl acetate (SP value: 9.0), tetrahydrofuran (SP value: 9.0), benzene (SP value: 9.2), methyl ethyl ketone (SP value: 9.3), acetone (SP value: 10.0), isopropyl alcohol (SP value: 11.5), acetonitrile (SP value: 11.9), ethanol (SP value: 12.7) and the like.

These SP values may be calculated by the methods described by R. F. Fedors in "Polymer Engineering and Science" 14(2), 147 (1974). The specific calculation method is shown by formula (1).

[Math. 1]

$$\delta = \sqrt{\frac{\sum \Delta E_{vap}}{\sum V}} \quad (1)$$

$\delta$: SP value $((cal/cm^3)^{1/2})$
$\Delta E_{vap}$: Molar evaporation heat of each atomic group (cal/mol)
V: Molar volume of each atomic group $(cm^3/mol)$ When polymerizing a monomer composition composed mainly of a monomer having a polar group such as a carboxyl group, sulfonic acid group or hydroxyl group, the range of the SP value of the polymerization solvent is preferably 9.0 to 13.0, or more preferably 9.0 to 12.5, or still more preferably 10.0 to 12.0. Composed mainly of such a monomer having a polar group means that the percentage of monomers having polar groups is at least 50 mass %, and this percentage may also be at least 60 mass %, or at least 70 mass %, or at least 80 mass %, or 100 mass %.

Furthermore, acetonitrile is preferred for achieving good polymerization stability with little production of coarse particles or adhesion to the reactor, for suppressing secondary aggregation of precipitated polymer fine particles, and for obtaining a polymer with a large degree of polymerization (primary chain length) and a small chain transfer constant.

When polymerizing a monomer composition that is not composed mainly of a monomer having a polar group, the range of the SP value of the polymerization solvent is preferably 8.0 to 12.0, or more preferably 8.5 to 12.0.

In the manufacturing method of the teaching, there are no particular restrictions on the types of vinyl monomers used in the polymerization step, which may be selected appropriately depending on the intended use and the like. Specific examples include ethylenically unsaturated carboxylic acid monomers, (meth)acrylic acid esters, (meth)acrylamide and its derivatives, and styrene monomers such as styrene and α-methylstyrene and the like.

Examples of ethylenically unsaturated carboxylic acid monomers include (meth)acrylic acid, crotonic acid, itaconic acid and maleic acid; (meth)acrylamide alkylcarboxylic acids such as (meth)acrylamidohexanoic acid and (meth)acrylamidododecanoic acid; and ethylenically unsaturated monomers having carboxyl groups, such as succinic acid monohydroxyethyl (meth)acrylate, ω-carboxycaprolactone mono(meth)acrylate and β-carboxyethyl (meth)acrylate, and (partially) alkali neutralized products of these, and one of these alone or a combination of two or more may be used. Of these, a compound having an acryloyl group tends to yield a high-molecular-weight polymer due to its high polymerization speed, and this tendency is particularly strong in the case of acrylic acid.

Types of salts include lithium, sodium, potassium and other alkali metal salts; alkali earth metal salts such as calcium salts and barium salts; metal salts such as magnesium salts and aluminum salts; and ammonium salts, organic amine salts and the like.

A monomer composition including an ethylenically unsaturated carboxylic acid monomer in the amount of 50 to 100 mass % may also be used in the manufacturing method of the teaching because it exhibits good polymerizability and is applicable to various uses. In this case, structural units derived from the ethylenically unsaturated carboxylic acid monomer are introduced into the resulting polymer fine particles in the amount of 50 to 100 mass %. The amount of the ethylenically unsaturated carboxylic acid monomer used may be 60 to 100 mass %, or 70 to 100 mass %, or 80 to 100 mass %.

The ethylenically unsaturated carboxylic acid monomer may be in an unneutralized state, or may be in the form of a neutralized salt. It may also be in the form of a partially neutralized salt in which part of the ethylenically unsaturated carboxylic acid monomer is neutralized. The polymerization speed is high and a polymer with a high molecular weight is obtained if the degree of neutralization of the ethylenically unsaturated carboxylic acid monomer is not more than 10 mol %.

Examples of (meth)acrylic acid esters include (meth)acrylic acid alkyl esters such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, pentyl (meth)acrylate, n-hexyl (meth)acrylate, n-octyl (meth)acrylate, 2-ethylhexyl (meth)acrylate, lauryl (meth)acrylate and stearyl (meth)acrylate; alicyclic group-containing esters of (meth)acrylic acid, such as cyclohexyl (meth)acrylate and isobornyl (meth)acrylate; heterocyclic group-containing esters of (meth)acrylic acid, such as glycidyl (meth)acrylate and tetrahydrofurfuryl (meth)acrylate; hydroxyalkyl esters of (meth)acrylic acid, such as 2-hydroxyethyl (meth)acrylate and hydroxypropyl (meth)acrylate; and alkoxyalkyl esters of (meth)acrylic acid, such as 2-methoxyethyl (meth)acrylate and the like. One of these alone or a combination of two or more may be used.

Examples of (meth)acrylamide derivatives include N-alkyl (meth)acrylamide compounds such as isopropyl (meth)acrylamide, t-butyl (meth)acrylamide, N-n-butoxymethyl (meth)acrylamide and N-isobutoxymethyl (meth)acrylamide; and N,N-dialkyl (meth)acrylamide compounds such as dimethyl (meth)acrylamide and diethyl (meth)acrylamide. One of these alone or a combination of two or more may be used.

Apart from the vinyl monomers described above, crosslinkable monomers such as multifunctional polymerizable monomers having two or more polymerizable unsaturated groups and monomers having self-crosslinking crosslinkable functional groups such as hydrolyzable silyl groups may also be used.

The multifunctional polymerizable monomers are compounds having two or more polymerizable functional groups such as (meth)acryloyl groups or alkenyl groups in the molecule, and examples include multifunctional (meth)acrylate compounds, multifunctional alkenyl compounds, and compounds having both (meth)acryloyl and alkenyl groups and the like. One of these alone or a combination of two or more may be used. Of these, a multifunctional alkenyl compound, which can easily produce a uniform crosslinked structure, is more likely to yield a uniform crosslinked structure, and this tendency is particularly strong in the case of a multifunctional allyl ether compound having multiple allyl ether groups in the molecule.

Examples of the multifunctional (meth)acrylate compounds include di(meth)acrylates of dihydric alcohols, such as ethylene glycol di(meth)acrylate, propylene glycol di(meth)acrylate, 1,6-hexanediol di(meth)acrylate, polyethylene glycol di(meth)acrylate and polypropylene glycol di(meth) acrylate; poly(meth)acrylates such as tri(meth)acrylates and tetra(meth)acrylates of trihydric and higher polyhydric alcohols, such as trimethylol propane tri(meth)acrylate, trimethylol propane ethylene oxide modified tri(meth)acrylate, glycerin tri(meth)acrylate, pentaerythritol tri(meth)acrylate and pentaerythritol tetra(meth)acrylate; and bisamides such as methylene bisacrylamide, hydroxyethylene bisacrylamide and the like.

Examples of the multifunctional alkenyl compounds include multifunctional allyl ether compounds such as trimethylol propane diallyl ether, trimethylol propane triallyl ether, pentaerythritol diallyl ether, pentaerythritol triallyl ether, tetraallyl oxyethane and polyallyl saccharose; multifunctional allyl compounds such as diallyl phthalate; and multifunctional vinyl compounds such as divinyl benzene and the like.

Examples of the compounds having both (meth)acryloyl and alkenyl groups include allyl (meth)acrylate, isopropenyl (meth)acrylate, butenyl (meth)acrylate, pentenyl (meth) acrylate, 2-(2-vinyloxyethoxy) ethyl (meth)acrylate and the like.

Specific examples of the monomers having self-crosslinking crosslinkable functional groups include vinyl monomers containing hydrolysable silyl groups, and N-methylol (meth) acrylamide, N-methoxyalkyl (meth)acrylate and the like. One of these alone or a combination of two or more may be used.

A vinyl monomer containing a hydrolysable silyl group is not particularly limited as long as it is a vinyl monomer having at least one hydrolysable silyl group. Examples include vinyl silanes such as vinyl dimethoxysilane, vinyl triethoxysilane, vinyl methyl dimethoxysilane and vinyl dimethyl methoxysilane; acrylic acid esters containing silyl groups, such as trimethoxysilylpropyl acrylate, triethoxysilylpropyl acrylate and methyl dimethoxysilylpropyl acrylate; methacrylic acid esters containing silyl groups, such as trimethoxysilylpropyl methacrylate, triethoxysilylpropyl methacrylate, methyl dimethoxysilylpropyl methacrylate and dimethyl methoxysilylpropyl methacryalte; vinyl ethers containing silyl groups, such as trimethoxysilylpropyl vinyl ether; and vinyl esters containing silyl groups, such as vinyl trimethoxysilyl undecanoate and the like.

The amount of the crosslinkable monomer used is not particularly limited, and may be at least 0.05 mass %, or at least 0.1 mass %, or at least 0.3 mass %, or at least 0.5 mass % of the total constituent monomers of the polymer fine particles. It may also be at least 1.0 mass %, or at least 3.0 mass %, or at least 5.0 mass %, or at least 10 mass %. The upper limit may be 100 mass %, or not more than 90 mass %, or not more than 80 mass %, or not more than 50 mass %, or not more than 30 mass %, or not more than 20 mass %, or not more than 10 mass %.

A known polymerization initiator such as an azo compound, organic peroxide, inorganic peroxide or the like may be used as the polymerization initiator, without any particular limitations. The conditions of use may be adjusted by a known method such as thermal initiation, redox initiation with a reducing agent, or UV initiation or the like to generate a suitable amount of radicals.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4,4-trimethylpentane) and 2,2'-azobis(2-methylpropane), and one or two or more of these may be used.

Examples of the organic peroxide include 2,2-bis(4,4-di-t-butylperoxycyclohexyl)propane ("Pertetra A", hereinafter, product name, manufactured by NOF Corporation), 1,1-di(t-hexylperoxy)cyclohexane ("Perhexa HC"), 1,1-di(t-butylperoxy)cyclohexane ("Perhexa C"), n-butyl-4,4-di(t-butylperoxy)valerate ("Perhexa V"), 2,2-di(t-butylperoxy) butane ("Perhexa 22"), t-butyl hydroperoxide ("Perbutyl H"), cumene hydroperoxide ("Percumyl H"), 1,1,3,3-tetramethylbutyl hydroperoxide ("Perocta H"), t-butylcumyl peroxide ("Perbutyl C"), di-t-butyl peroxide ("Perbutyl D"), di-t-hexyl peroxide ("Perhexyl D"), di(3,5,5-trimethylhexanoyl) peroxide ("Peroyl 355"), dilauroyl peroxide ("Peroyl L"), bis(4-t-butylcyclohexyl) peroxydicarbonate ("Peroyl TCP"), di-2-ethylhexyl peroxydicarbonate ("Peroyl OPP"), di-sec-butyl peroxydicarbonate ("Peroyl SBP"), cumyl peroxyneodecanoate ("Percumyl ND", hereinafter, product name, manufactured by NOF Corporation), 1,1,3,3-tetramethylbutyl peroxyneodecanoate ("Perocta ND"), t-hexyl peroxyneodecanoate ("Perhexyl ND"), t-butyl peroxyneodecanoate ("Perbutyl ND"), t-butyl peroxyneoheptanoate ("Perbutyl NHP"), t-hexyl peroxypivalate ("Perhexyl PV"), t-butyl peroxypivalate ("Perbutyl PV"), 2,5-dimethyl-2,5-di(2-ethylhexanoyl) hexane ("Perhexa 250"), 1,1,3,3-tetramethylbutyl peroxy-2-ethyl hexanoate, ("Perocta O"), t-hexyl peroxy-2-ethyl hexanoate ("Perhexyl O"), t-butyl peroxy-2-ethyl hexanoate ("Perbutyl O"), t-butyl peroxylaurate ("Perbutyl L"), t-butyl peroxy-3,5,5-trimethylhexanoate ("Perbutyl 355"), t-hexyl peroxyisopropyl monocarbonate ("Perhexyl I"), t-butyl peroxyisopropyl monocarbonate ("Perbutyl I"), t-butyl peroxy-2-ethylhexyl monocarbonate ("Perbutyl E"), t-butyl peroxyacetate ("Perbutyl A"), t-hexyl peroxybenzoate ("Perhexyl Z") and t-butyl peroxybenzote ("Perbutyl Z") and the like, and one or two or more of these may be used.

Examples of the inorganic peroxide include potassium persulfate, sodium persulfate, ammonium persulfate and the like.

In the case of a redox initiator, sodium sulfite, sodium thiosulfate, sodium formaldehyde sulfoxylate, ascorbic acid, sulfur dioxide gas ($SO_2$), ferrous sulfate or the like may be used as a reducing agent.

The amount of the polymerization initiator used is preferably 0.001 to 2 mass parts, or more preferably 0.005 to 1 mass part, or still more preferably 0.01 to 0.1 mass part per 100 mass parts of the total monomers used. If the amount of the polymerization initiator is at least 0.001 mass parts, a stable polymerization reaction can be achieved, while a polymer with a long primary chain length is obtained if the amount is not more than 2 mass parts.

The concentration of the monomers during polymerization is preferably high from the perspective of productivity, and to easily obtain a polymer with a high molecular weight. If the concentration of the monomers is too high, however, the polymer particles are likely to aggregate, making it hard to control the polymerization heat and raising the risk of a runaway polymerization reaction. Consequently, the monomer concentration at the beginning of polymerization is generally in the range of about 2 to 30 mass %, or preferably 5 to 30 mass %.

The polymerization temperature depends on conditions such as the type and concentration of the monomers used and the like, but is preferably 0° C. to 100° C., or more preferably 20° C. to 80° C. The polymerization temperature may be uniform, or may be changed during the period of the polymerization reaction. The polymerization time is preferably 1 minute to 20 hours, or more preferably 1 hour to 10 hours.

The polymer fine particles dispersion obtained through the polymerization step can be subjected to reduced pressure and/or heat treatment or the like in the drying step to remove the solvent and obtain the polymer fine particles in powder form. In this case, a solid-liquid separation step by centrifugation, filtration and the like and a washing step using water and methanol or the like are preferably included following the polymerization step with the aim of removing unreacted monomers (and salts thereof) before the drying step.

Including such a washing step makes it easier to re-disperse the polymer fine particles even if there has been secondary aggregation, and also allows performance decline due to unreacted monomers to be avoided because residual unreacted monomers are removed in the washing step.

In the manufacturing method of the teaching, the amount of water in the reaction solution containing the polymerization solvent, raw materials and the like in the polymerization step is preferably not more than 30,000 ppm by mass, or more preferably not more than 20,000 ppm, or still more preferably 15,000 ppm, or yet more preferably 10,000 ppm, or most preferably 6,000 ppm. If the amount of water is not more than 30,000 ppm, a polymer fine particles with narrow particle size distribution can be manufactured. The amount of water in the reaction solution may also be 0 ppm. The amount of water can be measured with a Karl Fischer moisture meter.

The polymerization reaction may also be performed by an initial batch polymerization method in which the entire amount of the raw materials is loaded into the reactor in advance. In this case, the amount of water in the reaction solution is preferably not more than 30,000 ppm after all the raw materials have been added. However, the polymerization reaction may also be performed by loading initial raw materials into the reactor, and then supplying the remaining raw materials either continuously or intermittently to the reactor while performing polymerization. In this case, the amount of water in the reaction solution is preferably not more than 30,000 ppm after the initial raw materials have been added. Moreover, the amount of water in the reaction solution is preferably kept at not more than 30,000 ppm throughout the entire period during which the residual raw materials are added and the polymerization reaction is continued.

The polymerization step is performed with a stirred tank type reactor. The reaction equipment used in the present teaching may be a batch-type reactor consisting of a single reactor, or a continuous reaction unit consisting of one or multiple reactors. In the case of a continuous reaction unit, a stirred tank type reactor is used at least for the reactor for performing the polymerization reaction.

The rotating stirring shaft of the stirred tank type reactor is equipped with a stirring blade classified as a so-called large blade. At least one kind of stirring blade selected from a large wide blade (wide-panel stirring blade) and a large lattice blade may be used as the large blade. When dispersion polymerization is performed using a stirred tank type reactor equipped with a large blade, the resulting polymer fine particles has a more uniform particles size and narrower particle size distribution than one manufactured using an ordinary stirring blade such as a paddle blade or receding blade.

Figure 1A:
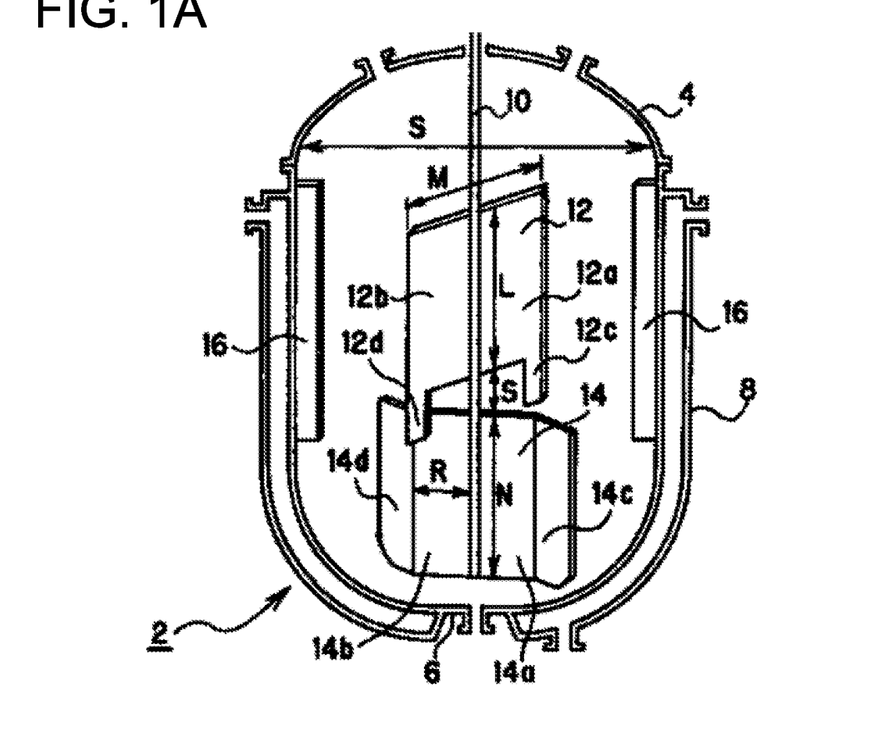
Figure 1B:
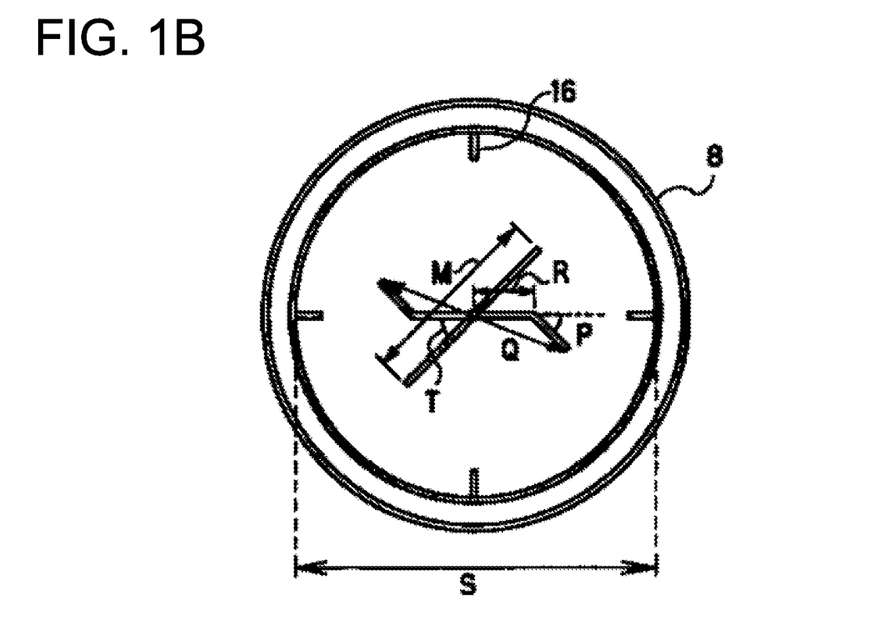

An example of such a large wide blade (wide-panel stirring blade) is a Fullzone-type mixing impeller. A Fullzone-type mixing impeller is a twin-paddle comprising two vanes arranged vertically on a vertical shaft. The vanes of the paddle may be arranged axisymmetrically. The heights of the vanes may be at least 50%, or at least 60%, or at least 70% of the blade diameter. The blade diameter of the lower paddle blade may be at least 50%, or at least 60%, or at least 70% of the inner diameter of the reactor. The outer ends of each paddle blade may be receding vanes having receding angles of 0° to 60°, or 5° to 60°. The lower paddle blade is preferably disposed adjacent to the lower surface of the reactor, while space for installing baffles is preferably provided between the upper and lower paddle blades and the inner surface of the reactor. The distance between the upper paddle blade and the lower paddle blade is preferably not more than 20% of the inner diameter of the reactor. Plate-shaped fins may also be formed projecting downwards from the ends of the upper paddle blade so that the upper and lower paddle blades partially overlap each other in the vertical direction at the outer ends. Furthermore, the upper paddle blade is preferably disposed at crossing angle of 30° to 90° or 45° to 75° to the lower paddle blade, and in advance of the lower paddle blade in the direction of rotation. An example of a Fullzone-type mixing impeller is a mixing impeller "FULLZONE" (product name) manufactured by Kobelco Eco-Solutions Co., Ltd.

Other examples of large wide blades (wide-panel stirring blades) include "Super-Mix MR203" and "Super-Mix MR205" (product names) manufactured by Satake Chemical Equipment Mfg., Ltd., "Hi-F Mixer" (product name) manufactured by Soken Tecnix Co., Ltd., and the like.

Figure 2A:
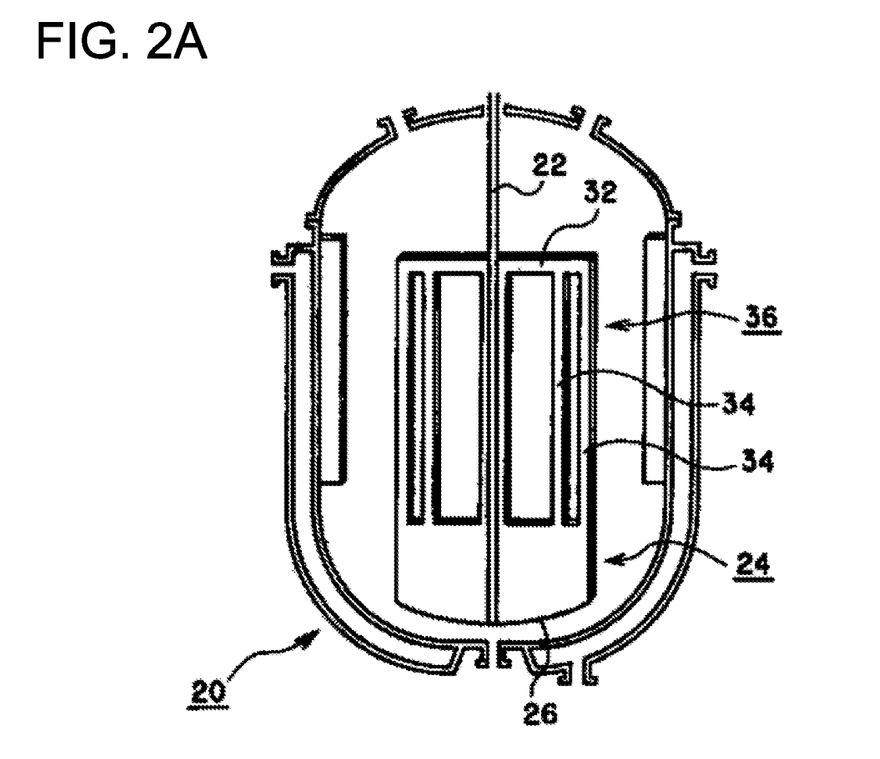
Figure 2B:
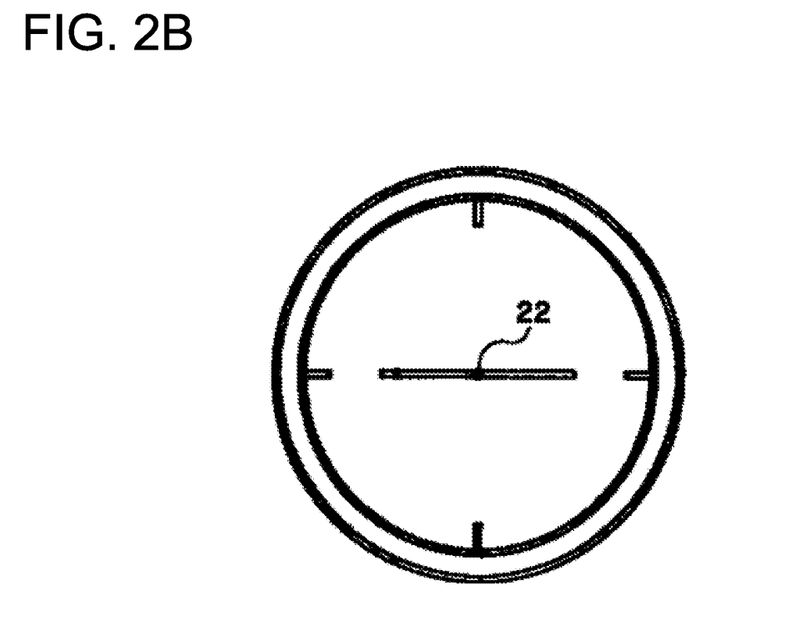

Examples of wide lattice blades include Maxblend-type mixing impellers. A Maxblend-type mixing impeller comprises a paddle blade mounted on a rotating stirring shaft, and this paddle blade is preferably disposed adjacent to the bottom surface of the reactor, with a clearance of 1% to 10% of the internal tank diameter between the bottom end of the stirring blade and the bottom of the tank. Above the paddle blade is a lattice blade composed of flat bar-shaped arm parts extending in the radial direction of the tank and flat bar-shaped strips extending perpendicular to the arm parts. The lattice blade is preferably formed so that the gaps between strips become narrower with increased distance from the rotating shaft. The blade diameter of the bottom part may be at least 50%, or at least 60%, or at least 70% of the inner diameter of the reactor. The blade height may be at least 50%, or at least 70%, or at least 100%, or at least 120%, or at least 150% of the blade diameter. A specific example of a Maxblend-type stirring blade is the "MAXBLEND" (product name) manufactured by Sumitomo Heavy Industries Process Equipment Co., Ltd.

The stirring rotation in the polymerization step may be adjusted appropriately according to the scale of the reaction solution, but to suppress coalescence of the precipitated polymer and obtain a polymer fine particles with narrow particle size distribution, the tip speed (circumferential speed) of the stirring blade is preferably not more than 1.0 in/sec. The tip speed is more preferably not more than 0.8 m/sec, or still more preferably not more than 0.6 in/sec. The minimum tip speed may be set appropriately according to the reaction solution stirring conditions, but is normally at least 0.01 m/sec.

The viscosity of the polymer fine particles dispersion obtained through the polymerization step may be in the range of 1 to 100,000 mPa·s, or 10 to 50,000 mPa·s, or 50 to 20,000 mPa·s, or 100 to 10,000 mPa·s. The viscosity of the polymer fine particles dispersion is measured at 60 rpm using a B-type viscometer at 25° C.

With the manufacturing method of the teaching, secondary aggregation of the produced polymer fine particles is suppressed, yielding a polymer fine particles with narrow particles size distribution. The particles diameter of the polymer fine particles may be, for example, 10 nm to 7.0 μm (volume-based median diameter), and the particles size distribution is preferably less than 2.0. The particle size distribution is preferably less than 1.8, or more preferably less than 1.5, or still more preferably less than 1.3, or yet more preferably less than 1.2. The lower limit of the particle size distribution is normally 1.0. The particles diameter and particle size distribution can be measured by the methods described in the examples.

EXAMPLES

The present teaching is explained below based on examples. The present teaching is not limited to these examples. "Parts" and "percentage" values below represent mass parts and mass percentages unless otherwise specified.

Example 1: Manufacture of Polymer Fine Particles R-1

A 3-liter reactor equipped with a Fullzone-type impeller (Kobelco Eco-Solutions Co., Ltd.), a thermometer, a reflux condenser and a nitrogen introduction pipe was used for polymerization.

3.52 kg (880 parts) of acetonitrile, 0.40 kg (100 parts) of acrylic acid (hereunder called "AA") and 2.0 g (0.5 parts) of pentaerythritol triallyl ether (Daiso Chemical Co., Ltd., product name "Neoallyl P-30") were loaded into the reactor. At this time, the amount of water in the reaction solution was found to be 650 ppm as measured with a Karl Fischer moisture meter (Hiranuma Sangyo Co., Ltd., "AQ-2200A").

The inside of the reactor was thoroughly purged with nitrogen, and heated to raise the internal temperature to 50° C. The stirring speed was set at a tip speed of 0.5 m/sec, and once the internal temperature was confirmed to be stable at 50° C., 0.125 parts of 2,2'-azobis(2,4-dimethylvaleronitrile) (Wako Pure Chemical Industries, Ltd., product name "V-65") were added as a polymerization initiator, and since white turbidity was observed in the reaction solution, this was taken as the polymerization initiation point. The polymerization reaction was continued while adjusting the outer temperature (water bath temperature) so that the internal temperature remained 50° C., and once 7 hours had passed since the polymerization initiation point, the reaction solution was cooled to obtain a polymerization reaction solution R-1 in the form of a slurry comprising particles of a polymer fine particles R-1 dispersed in a medium.

(Evaluation of Monodisperity: Particle Size Distribution Measurement)

The particle size distribution of the polymer reaction solution R-1 obtained above was measured with a laser diffraction/scattering particle size distribution analyzer (MicrotracBEL Corp., Microtrac MT-3300EXII). When monodispersity was then evaluated according to the following criteria, the particle size distribution (represented as volume-based median diameter/number-average median diameter) was found to be 1.11, and monodispersity was ranked as "1".

Evaluation Criteria
1: Volume-based median diameter/number-average median diameter=less than 1.20
2: Volume-based median diameter/number-average median diameter=at least 1.20 and less than 1.50
3: Volume-based median diameter/number-average median diameter=at least 1.50 and less than
4: Volume-based median diameter/number-average median diameter=at least 10

Examples 2 to 6 and 13: Manufacture of Polymer Fine Particles R-2 to R-6 and R-13

Polymer fine particles R-2 to R-6 and R-13 were obtained by the same operations as in Example 1 except that the compositions were changed as shown in Table 1. Monodispersity was then evaluated by the same operations as in Example 1, with the results shown in Table 1.

Examples 7 to 9 and Comparative Example 1: Manufacture of Polymer Fine Particles R-7 to R-9 and H-1

Polymer fine particles R-7 to R-9 and H-1 were obtained by the same operations as in Example 1 except that the amount of water was adjusted by adding distilled water after the raw materials were loaded. Monodispersity was then evaluated by the same operations as in Example 1, with the results shown in Table 1.

Examples 10 and 11 and Comparative Example 2: Manufacture of Polymer Fine Particles R-10, R-11 and H-2

Polymer fine particles R-10, R-11 and H-2 were obtained by the same operations as in Example 1 except that the stirring speed (tip speed) during polymerization was changed as shown in Table 1. Monodispersity was then evaluated by the same operations as in Example 1, with the results shown in Table 1.

Example 12: Manufacture of Polymer Fine Particles R-12

A polymer fine particles R-12 was obtained by the same operations as in Example 1 except that polymerization was scaled up to a 400-liter reactor, and the charged amounts were changed as shown in Table 1. Monodispersity was then evaluated by the same operations as in Example 1, with the results shown in Table 1.

Example 14 and Comparative Examples 3 and 4: Manufacture of Polymer Fine Particles R-14, H-3 and H-4

Polymer fine particles R-14, H-3 and H-4 were obtained by the same operations as in Example 1 except that the stirring blade was replaced with a Maxblend-type impeller (Sumitomo Heavy Industries, Ltd., Example 14), a 3-blade retreat impeller (Comparative Example 3) or a 4-vaned paddle blade (Comparative Example 4). Monodispersity was then evaluated by the same operations as in Example 1, with the results shown in Table 1. The blade height of the paddle blades used in Comparative Example 4 was 15% of the blade diameter, and the blade diameter was 60% of the internal reactor diameter.

TABLE 1

| | Polymer fine particle | Monomer (kg) AA | Monomer (kg) Acrylamide | Polymerization solvent (kg) Acetonitrile | Polymerization solvent (kg) MEK | P-30 (g) | Polymerization monomer concentration (wt %) | Water content (wtppm) | Stirring blade | Tip speed (m/s) | Monodispersity | Particle size distribution | Median diameter (μm) |
|---|---|---|---|---|---|---|---|---|---|---|---|---|---|
| Ex 1 | R-1 | 0.40 | | 3.52 | | 2.0 | 10.2 | 650 | Fullzone-type | 0.5 | 1 | 1.11 | 0.55 |
| Ex 2 | R-2 | 0.40 | | 3.52 | | 0.0 | 10.2 | 600 | | | 1 | 1.15 | 0.53 |
| Ex 3 | R-3 | 0.40 | | 3.52 | | 6.0 | 10.2 | 570 | | | 1 | 1.12 | 0.56 |
| Ex 4 | R-4 | 0.40 | | 3.52 | | 20.0 | 10.2 | 620 | | | 1 | 1.15 | 0.54 |
| Ex 5 | R-5 | 0.40 | | 3.52 | | 2.0 | 10.2 | 790 | | | 1 | 1.13 | 0.53 |
| Ex 6 | R-6 | 0.40 | | | 3.52 | 0.0 | 10.2 | 600 | | | 1 | 1.19 | 0.54 |
| Ex 7 | R-7 | 0.40 | | 3.52 | | 2.0 | 10.2 | 3,250 | | | 1 | 1.12 | 0.58 |
| Ex 8 | R-8 | 0.40 | | 3.52 | | 2.0 | 10.2 | 5,350 | | | 1 | 1.15 | 0.57 |
| Ex 9 | R-9 | 0.40 | | 3.52 | | 2.0 | 10.2 | 27,200 | | | 2 | 1.33 | 0.54 |
| Ex 10 | R-10 | 0.40 | | 3.52 | | 2.0 | 10.2 | 677 | | 0.7 | 1 | 1.18 | 0.55 |
| Ex 11 | R-11 | 0.40 | | 3.52 | | 2.0 | 10.2 | 654 | | 0.9 | 2 | 1.28 | 0.62 |
| Ex 12 | R-12 | 50 | | 440 | | 250.0 | 10.2 | 668 | | 0.5 | 1 | 1.18 | 0.54 |
| Ex 13 | R-13 | 0.22 | 0.18 | 3.52 | | 2.0 | 10.2 | 618 | | | 1 | 1.19 | 0.55 |
| Ex 14 | R-14 | 0.40 | | 3.52 | | 2.0 | 10.2 | 556 | Maxblend-type | | 2 | 1.25 | 0.63 |
| CE 1 | H-1 | 0.40 | | 3.52 | | 2.0 | 10.2 | 32,700 | Fullzone-type | | 4 | 10.2 | 0.85 |
| CE 2 | H-2 | 0.40 | | 3.52 | | 2.0 | 10.2 | 556 | | 1.2 | 4 | 11.8 | 0.75 |

TABLE 1-continued

| | Polymer fine particle | Monomer (kg) | | Polymerization solvent (kg) | | Polymerization monomer P-30 (g) | monomer concentration (wt %) | Water content (wtppm) | Stirring blade | Tip speed (m/s) | Mono-dispersity | Particle size distribution | Median diameter (μm) |
|---|---|---|---|---|---|---|---|---|---|---|---|---|---|
| | | AA | Acryl-amide | Acetonitrile | MEK | | | | | | | | |
| CE 3 | H-3 | 0.40 | | 3.52 | | 2.0 | 10.2 | 780 | 3-blade retreat impeller | 0.5 | 4 | 13.8 | 0.78 |
| CE 4 | H-4 | 0.40 | | 3.52 | | 2.0 | 10.2 | 567 | Paddle blade | 0.5 | 3 | 2.50 | 0.65 |

In Examples 1 to 14, polymer fine particles were manufactured by the manufacturing method of the present teaching. The resulting polymer fine particles all had excellent monodisperity.

On the other hand, the polymers obtained in Comparative Examples 3 and 4 without using a large wide blade or large lattice blade had broader particle size distribution, and inferior monodisperity. Even using a large wide blade, moreover, monodispersed polymer fine particles were not obtained in Comparative Example 1 (in which the reaction solution contained more water) or Comparative Example 2 (in which the tip speed of the stirring blade was faster).

INDUSTRIAL APPLICABILITY

With the method for manufacturing polymer fine particles of the present teaching, a polymer fine particles having narrow particle size distribution and a highly uniform particles size can be manufactured by a simple method. Furthermore, this method is also excellent in productivity because there is no need to separately prepare a special dispersion stabilizer or the like during manufacture.

The polymer fine particles obtained by the manufacturing method of the teaching can be used widely in various fields including spacers for liquid crystal displays, light diffusing agents for light diffusing films and diffusing plates, AG agents in AG films and the like, antiblocking agents for various films, conductive fine particles, column fillers, diagnostic drug carriers, photographic toners, binders and dispersants in compositions for non-aqueous electrolyte secondary battery electrodes, and cosmetics and the like.

REFERENCE SIGNS LIST

2 Reaction tank
4 Upper lid
6 Base
8 Jacket
10 Rotating stirring shaft
12 Upper paddle blade
12a, 12b Vanes
12c, 12d Fins
14a, 14b Vanes
14c, 14d Retreat blades
16 Baffle
L, N Height
M, Q Blade diameter
R Length of curved part
S Distance between blades
T Crossing angle
U Tank diameter
20 Reaction tank
22 Rotating stirring shaft
24 Paddle blade
26 Lower end
32 Arm part
34 Strip
36 Lattice blade

The invention claimed is:

1. A method for manufacturing polymer fine particles, comprising:
polymerizing a vinyl monomer using a dispersion polymerization method,
wherein
an amount of water in a reaction liquid in the polymerizing is no more than 30,000 ppm,
a reactor in the polymerizing is a stirred tank type reactor,
a stirring blade mounted on a rotating stirring shaft of the stirred tank type reactor is a blade that is selected from a blade having two paddles arranged vertically and a blade having a lattice blade composed of flat bar-shaped arm parts extending in a radial direction of the reactor and mounted on the rotating stirring shaft and flat bar-shaped strips extending perpendicular to the arm parts,
a tip speed of the stirring blade is not more than 1.0 m/sec, and
the vinyl monomer contains (meth)acrylic acid in an amount of at least 50 mass % of a total amount of the vinyl monomer.

2. The method for manufacturing polymer fine particles according to claim 1, wherein the blade is the blade having the two paddles arranged vertically.

3. The method for manufacturing polymer fine particles according to claim 1, wherein the blade is the blade having the lattice blade.

4. The method for manufacturing polymer fine particles according to claim 1, wherein a SP value of a polymerization solvent used in the polymerizing is 8.0 to 13.0.

5. The method for manufacturing polymer fine particles according to claim 2, wherein a SP value of a polymerization solvent used in the polymerizing is 8.0 to 13.0.

6. The method for manufacturing polymer fine particles according to claim 3, wherein a SP value of a polymerization solvent used in the polymerizing is 8.0 to 13.0.

7. The method for manufacturing polymer fine particles according to claim 1, wherein the method includes no dispersion stabilizer.

8. The method for manufacturing polymer fine particles according to claim 1, wherein the polymer fine particles has a particle size distribution that is in a range of 1.0 to less than 2.0.

9. The method for manufacturing polymer fine particles according to claim 8, wherein the particle size distribution is in a range of 1.0 to less than 1.8.

10. The method for manufacturing polymer fine particles according to claim 8, wherein the particle size distribution is in a range of 1.0 to less than 1.5.

11. The method for manufacturing polymer fine particles according to claim 4, wherein the polymerization solvent includes at least one of acetonitrile and methyl ethyl ketone.

\* \* \* \* \*